(12) United States Patent
Terao et al.

(10) Patent No.: US 8,094,346 B2
(45) Date of Patent: Jan. 10, 2012

(54) IMAGE READING APPARATUS WITH DOCUMENT COVER INCLUDING A PRESSING PORTION

(75) Inventors: Akira Terao, Aichi-ken (JP); Masato Moribe, Inazawa (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 1134 days.

(21) Appl. No.: 11/771,415

(22) Filed: Jun. 29, 2007

(65) Prior Publication Data

US 2008/0123158 A1 May 29, 2008

(30) Foreign Application Priority Data

Jun. 30, 2006 (JP) ................................. 2006-181773

(51) Int. Cl.
*H04N 1/04* (2006.01)
(52) U.S. Cl. ......................... 358/474; 358/471; 358/400
(58) Field of Classification Search .................. 358/474, 358/471, 400
See application file for complete search history.

(56) References Cited

U.S. PATENT DOCUMENTS

| | | | |
|---|---|---|---|
| 6,405,017 B1 | 6/2002 | Takahashi et al. | |
| 6,628,431 B1 | 9/2003 | Masuda et al. | |
| 6,795,219 B2 * | 9/2004 | Fujita | 358/496 |

FOREIGN PATENT DOCUMENTS

| | | |
|---|---|---|
| JP | 555146 | 7/1993 |
| JP | UM-A-H05-055146 U | 7/1993 |
| JP | 8172510 | 7/1996 |
| JP | 10257262 | 9/1998 |
| JP | 11024181 | 1/1999 |
| JP | 11196222 | 7/1999 |
| JP | 2000010212 | 1/2000 |
| JP | 2000347318 | 12/2000 |
| JP | 2001022010 | 1/2001 |
| JP | 2001024843 | 1/2001 |
| JP | 2001075194 | 3/2001 |
| JP | 2002209037 | 7/2002 |
| JP | 2005070523 | 3/2005 |

* cited by examiner

*Primary Examiner* — Benny Tieu
*Assistant Examiner* — Martin Mushambo
(74) *Attorney, Agent, or Firm* — Banner & Witcoff, Ltd.

(57) ABSTRACT

An image reading apparatus includes an image pickup element that emits an electrical signal based on received light, a document table including a reading window, a document cover, a base plate including a flat portion that opposes the reading window, the base plate being displaceable in a direction of separating from the document cover and a direction of approaching the document cover, a spring portion that is integrally formed with the base plate, and a document presser that presses the document placed on the document table toward the reading window and includes an elastic member that is elastically deformable and is adhered to a reading window side of the base plate. The document cover includes a first pressing portion that conveys force due to a weight of the document cover acting to press the spring portion toward the reading window when the document cover covers the reading window.

13 Claims, 7 Drawing Sheets

FIG. 5A
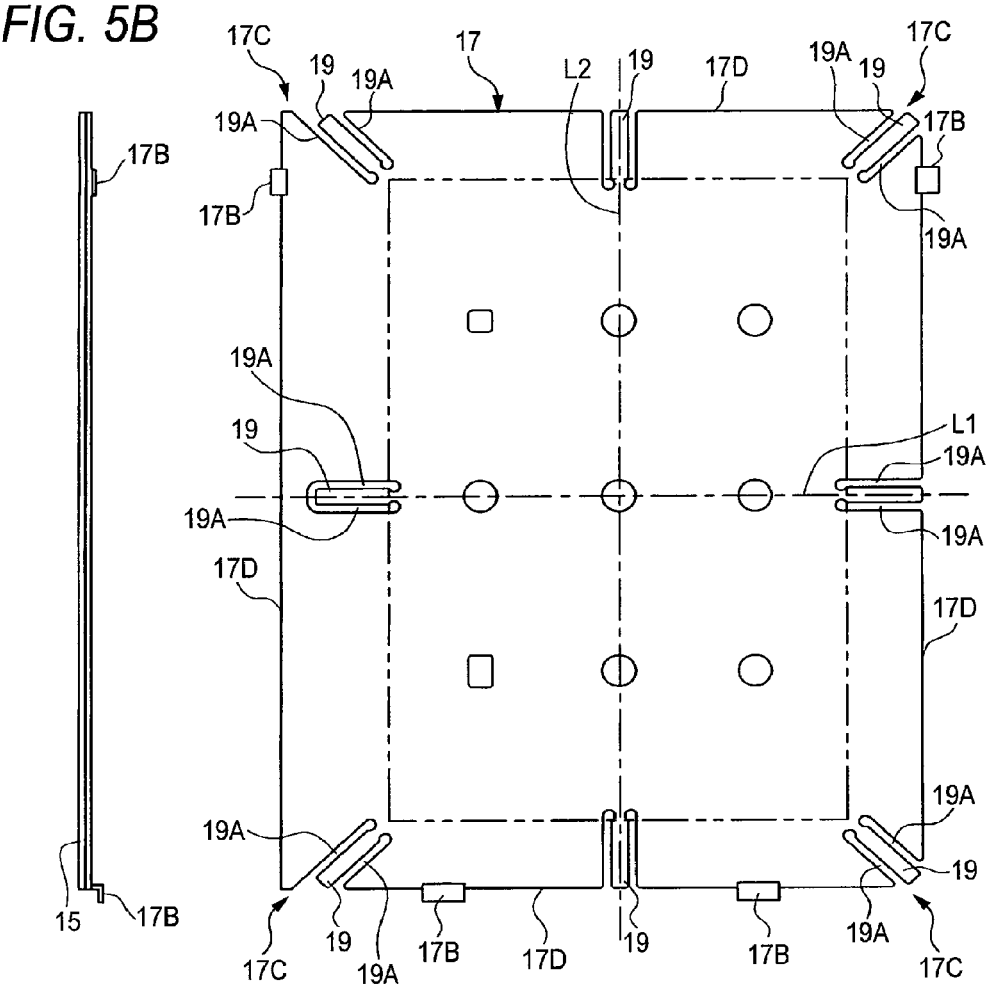
FIG. 5B
FIG. 5C
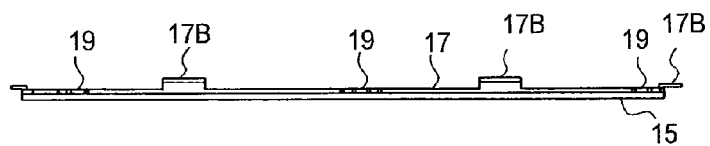

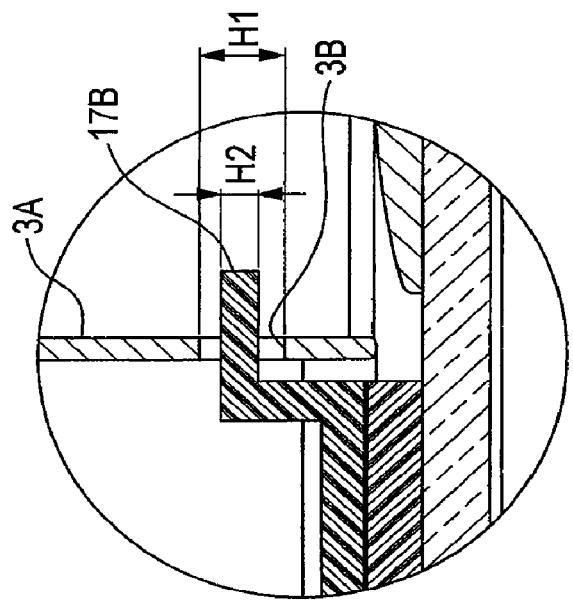
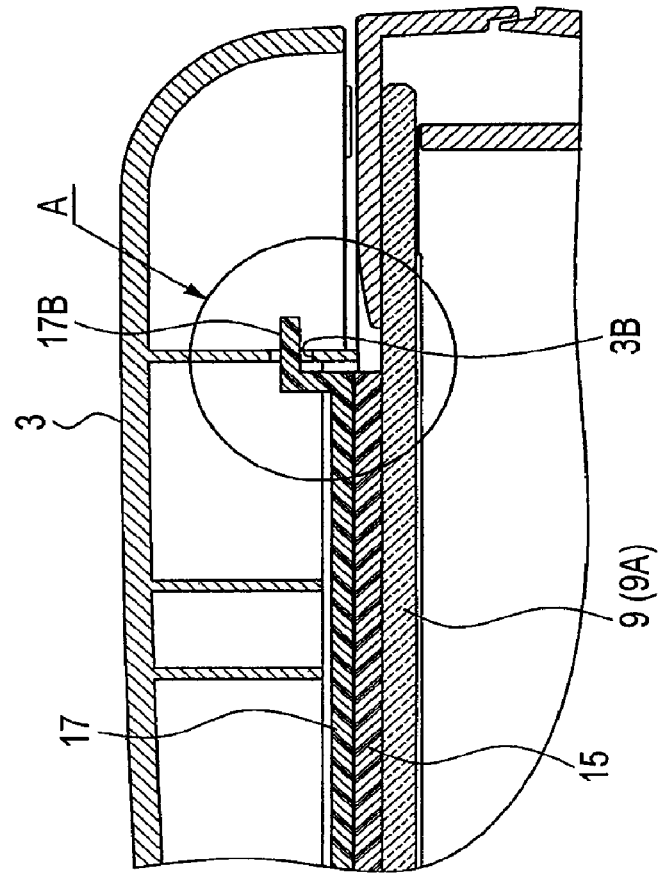

ved by the document presser. However, if the document presser itself is distorted, a document will then be raised partially with respect to the reading window and an image cannot be read accurately by an image pickup element.

IMAGE READING APPARATUS WITH DOCUMENT COVER INCLUDING A PRESSING PORTION

CROSS-REFERENCE TO RELATED APPLICATION

This application claims priority from Japanese Patent Application No. 2006-181773, filed on Jun. 30, 2006, the entire subject matter of which is incorporated herein by reference.

TECHNICAL FIELD

Aspects of the present invention relates to a flatbed type image reading apparatus.

BACKGROUND

An image reading apparatus illuminates light onto a document placed on a reading window for image reading and receives the reflected light by an image pickup element to read the image.

A normal flatbed type image reading apparatus is provided with a document cover that covers the reading window from above to prevent light, besides the reflected light reflected from the document, from becoming incident on the image pickup element.

The document cover is provided with a document presser, and by using the document presser to put a document in close contact with the reading window, the focal point of the image pickup element is set on the document.

However, if the document presser is fixed to the document cover and the document cover is distorted, because the document presser is then affected by the distortion and is distorted as well, a document may become raised partially from the reading window. Because when the document is raised, the document deviates from the focal point position of the image pickup element, and the quality of the image data read by the image pickup element is degraded.

JP-A-2002-209037 discloses a document presser that contacts a document and presses the document, assembled onto a document cover in a manner enabling displacement (free movement) with respect to the document cover, and the document presser is displaced with respect to the document cover.

The document presser is made less likely to be affected by distortion of the document cover. Thus, distortion of the document presser due to the influence of the distortion of the document cover can be prevented and degradation of the quality of image data read from a document can be suppressed.

The document presser is displaceable with respect to the document cover and the distortion of the document cover can thus be absorbed by the document presser. However, if the document presser itself is distorted, a document will then be raised partially with respect to the reading window and an image cannot be read accurately by an image pickup element.

Further, since the document presser is displaceable with respect to the document cover, the force of putting (pressing) a document into close contact with the reading window is constituted of just the force due to the weight of the document presser, and the weight of the document cover does not contribute to putting the document in close contact with the reading window.

The weight of the document presser is normally small in comparison to that of the document cover. Thus, in JP-A-2002-209037, a force sufficient for putting a document into close contact with the reading window cannot be made.

SUMMARY

Aspects of the present invention accomplish the placement of a document into close contact with a reading window in an image reading apparatus.

BRIEF DESCRIPTION OF THE DRAWINGS

FIGS. 5A-5C show three-side views of a base plate of the image reading apparatus;
FIG. 8A is a sectional view taken on line VIII-VIII of FIG. 1,
and FIG. 8B is an enlarged view of a portion A of FIG. 8A.

DETAILED DESCRIPTION

General Overview

An aspect of the present invention provides an image reading apparatus including: an image pickup element that emits an electrical signal based on received light; a document table, on which a document is placed, the document table including a reading window for reading an image of the document; a document cover that is assembled onto the document table and is capable of covering the reading window; a base plate that has a substantially rectangular shape and includes a flat portion that opposes the reading window, the base plate being displaceable in a direction of separating from the document cover and a direction of approaching the document cover; a spring portion that is integrally formed with the base plate; and a document presser that presses the document placed on the document table toward the reading window and includes an elastic member that is elastically deformable and is adhered to a reading window side of the base plate, wherein the document cover includes a first pressing portion that conveys force due to a weight of the document cover acting to press the spring portion toward the reading window when the document cover covers the reading window.

<Illustrative Aspects>

Illustrative aspects of the invention are described as follows with reference to the accompanying drawings.

In an aspect, an exemplary embodiment of the present invention is applied to a flatbed type image reading apparatus (scanner), having both an automatic conveying and reading function of reading an image recorded on a document while conveying the document automatically, and a flatbed reading function of reading an image recorded on a document that is placed in a stationary manner.

1. General Arrangement of an Image Reading Apparatus 1

Figure 1:
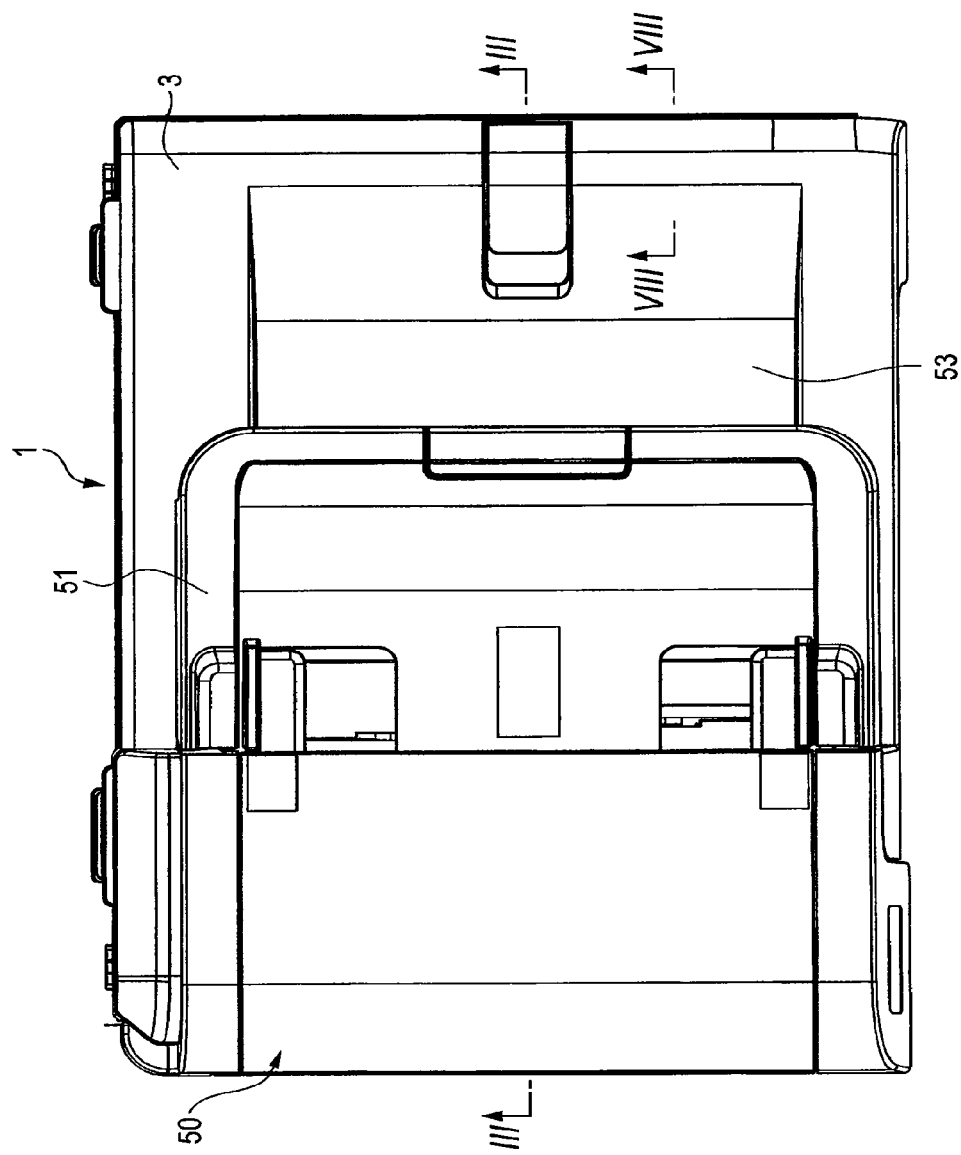
FIG. 1 is an upper view of an image reading apparatus.
Figure 2:
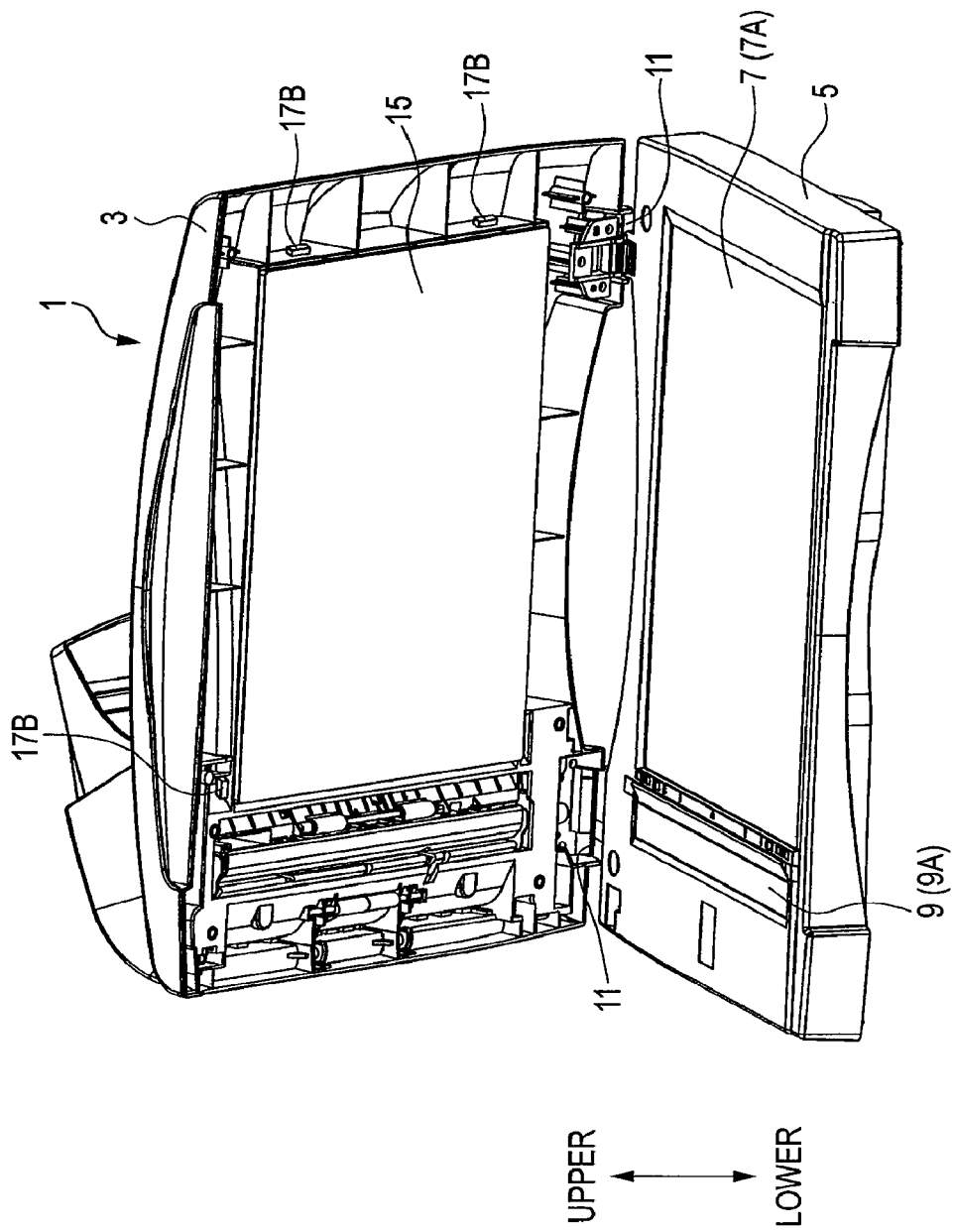
FIG. 2 is a perspective view of a state in which a document cover is opened in the image reading apparatus.
Figure 3:
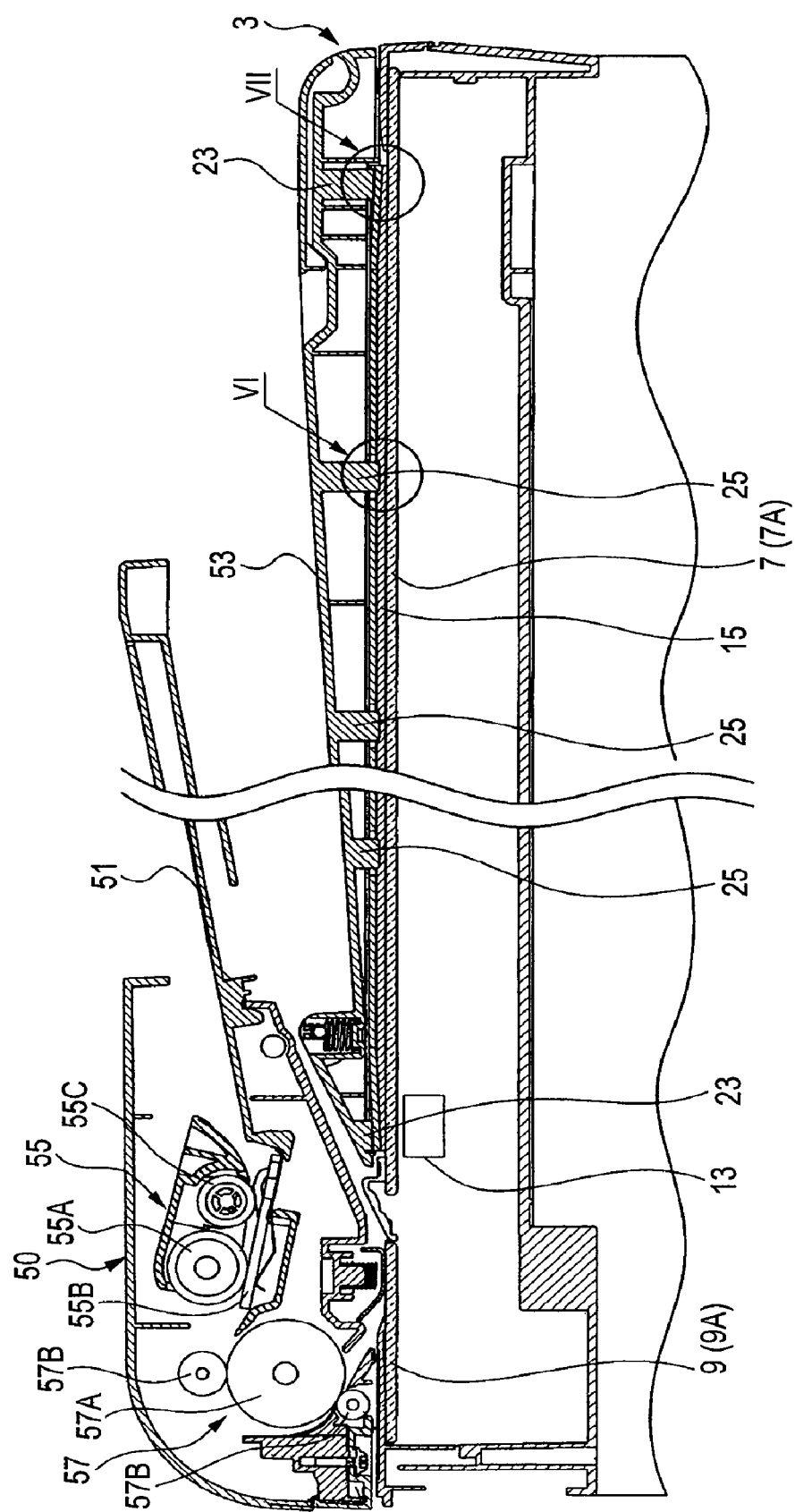
FIG. 3 is a sectional view taken on line III-III of FIG. 1.
Figure 4:
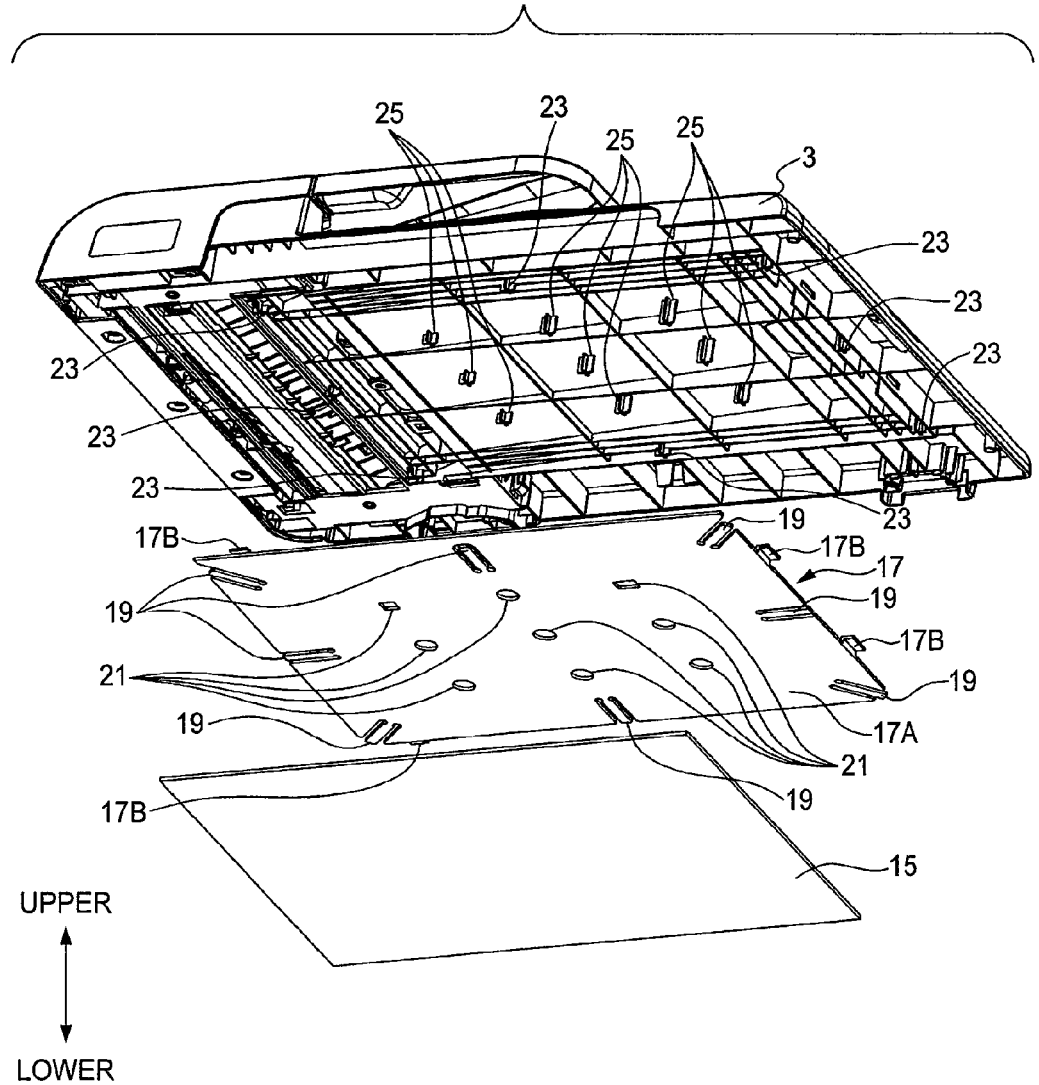
FIG. 4 is a partial exploded perspective view of the image reading apparatus as viewed from below.
Figure 6:
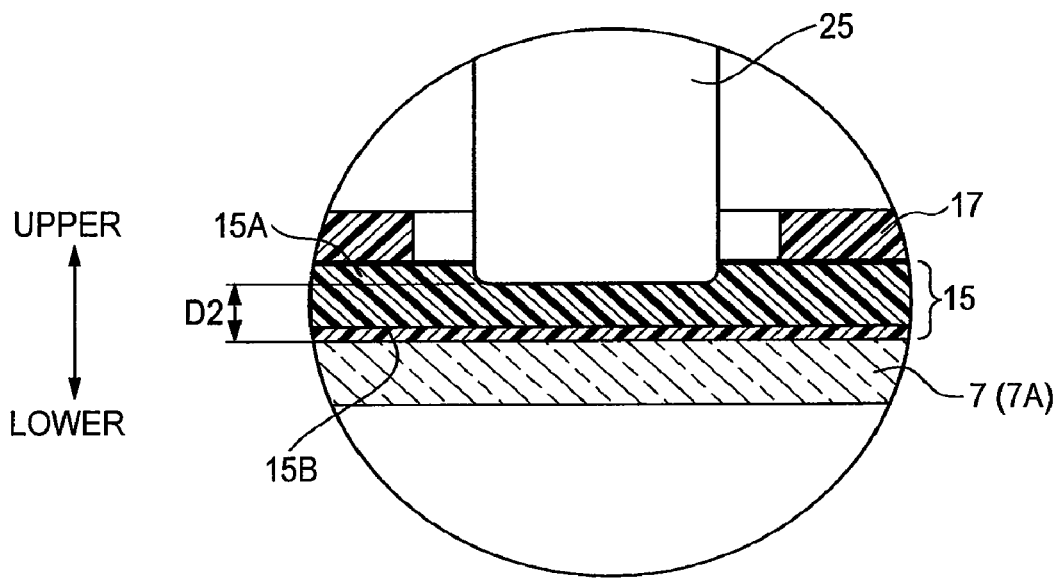
FIG. 6 is an enlarged view of a portion VI of FIG. 3.
Figure 7:
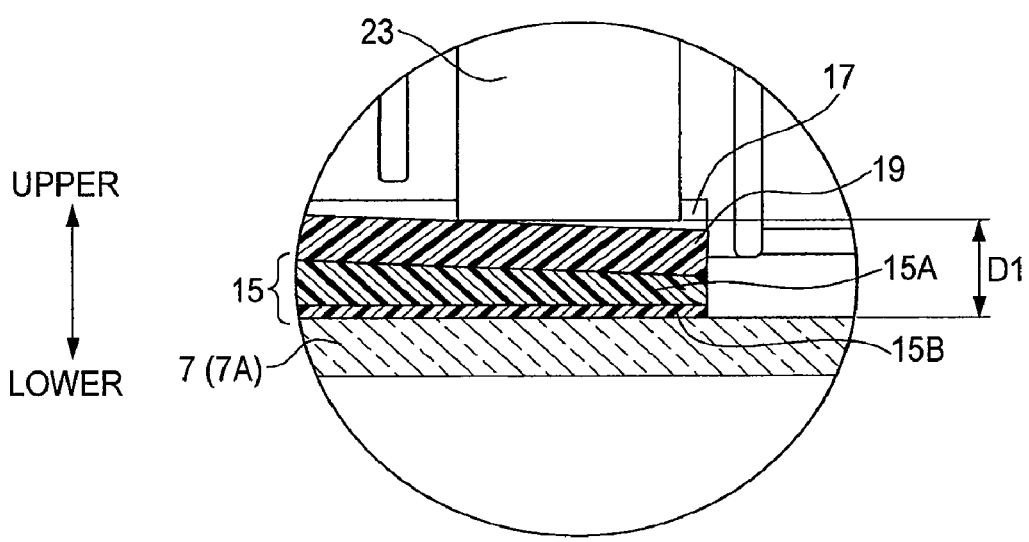
FIG. 7 is an enlarged view of a portion VII of FIG. 3; and
FIG. 8

FIG. 1 is an upper view of an image reading apparatus 1 according to the present aspect. FIG. 2 is a perspective view of a state in which a document cover 3 is opened. FIG. 3 is a sectional view taken on line III-III of FIG. 1. FIG. 4 is an exploded perspective view of the document cover 3, a base plate 17, etc., as viewed from below. FIGS. 5A-5C shows three-side views of the base plate 17. FIG. 6 is an enlarged view of a portion VI of FIG. 3. FIG. 7 is an enlarged view of a portion VII of FIG. 3. FIG. 8A is a sectional view taken on line VIII-VIII of FIG. 1, and FIG. 8B is an enlarged view of a portion A of FIG. 8A.

As shown in FIG. 2, a document table 5, on which a document is placed, is provided with an image reading window (referred to hereinafter as "flatbed reading window") 7, which is for the flatbed reading function and spreads in substantially horizontal directions, and an image reading window (referred to hereinafter as "automatic reading window") 9, which is for the automatic conveying and reading function. The reading windows 7 and 9 are respectively closed by transparent platens 7A and 9A, made of glass, acryl, etc.

2. Arrangement of the Flatbed Reading Window (Flatbed Portion, Etc.)

A document cover 3, which covers the flatbed reading window 7 from an upper side, is swingably assembled onto the document table 5 via a hinge mechanism 11. Accordingly, a user can swing (opening/closing) the document cover 3 with respect to the document table 5 to switch between a state of covering the flatbed reading window 7 from the upper side and a state of exposing the flatbed reading window 7.

In FIG. 3, an image pickup element 13 receives light that is reflected upon being illuminated onto a document and generates an electrical signal based on the received light. The image reading apparatus 1 converts characters or other image recorded on the document into electrical signals via the image pickup element 13 and reads the image.

The image pickup element 13 is incorporated inside the document table 5 in a manner enabling movement in a longitudinal direction (left/right direction in FIG. 3) of the document table 5. When the automatic conveying and reading function is operative, the image pickup element 13 reads an image while being positioned still immediately below the automatic reading window 9. When the flatbed reading function is operative, the image pickup element 13 reads an image while moving immediately below the flatbed reading window 7.

In the present aspect, a contact image sensor (CIS) may be used as the image pickup element 13. A longitudinal direction of this CIS (image pickup element 13) extends in a direction (a width direction orthogonal to the paper surface of FIG. 3) orthogonal to the movement direction immediately below the respective reading windows 7 and 9.

A document presser 15 presses a document placed on the flatbed reading window 7 against the flatbed reading window 7. The document presser 15 is disposed at a portion of the document cover 3 that opposes the flatbed reading window 7. As shown in FIG. 6, the document presser 15 includes an elastic member 15A, which is adhered to the flatbed reading window 7 side of the base plate 17 to be described below, and a sheet 15B, which is adhered to the flatbed reading window 7 side of the elastic member 15A.

The elastic member 15A is formed by forming a sponge or other elastically deformable elastic material to a flat form. The sheet 15B directly contacts a document placed on the flatbed reading window 7.

As shown in FIG. 4, the base plate 17 has a substantially rectangular plate-like shape (an oblong plate-like shape in the present aspect) constituted of a flat portion 17A that opposes the flatbed window 7. The base plate 17 is assembled onto the document cover 3 in a manner enabling displacement in a direction of separating from the document cover 3 and a direction of approaching the document cover 3, that is, displacement in vertical directions.

Specifically, substantially L-like protrusions 17B that protrude outward are provided at end portions (four locations in the present aspect) of the base plate 17 as shown in FIGS. 8A-8B. Meanwhile, insertion slots 3B, into which the protrusions 17B are inserted, are provided in reinforcing walls 3A of the document cover 3. Because a vertical direction dimension H1 of each insertion slot 3B is set larger than a vertical direction dimension H2 of each protrusion 17B, the base plate 17 can be displaced within the range of the dimension H1 of the insertion slots 3B in the vertical directions with respect to the document cover 3.

The dimension H1 of the insertion slots 3B is set based on a maximum distortion amount of the document cover 3, a maximum distortion amount of the base plate 17, etc. In the present aspect, the dimension H1 of the insertion slots 3B is set so that when the flatbed reading window 7 is covered by the document cover 3, gaps of no less than a predetermined dimension form between an upper end surface of each protrusion 17B and an upper end inner wall surface of each insertion slot 3B and between a lower end surface of each protrusion 17B and a lower end inner wall surface of each insertion slot 3B as shown in FIG. 8B.

As shown in FIG. 4 and FIGS. 5A-5C, the base plate 17 includes spring portions 19 having plate spring shape, one end side of each of which is made integral to an outer edge side of the base plate 17. A tip side of the spring portion 19 extends to an outer side of the base plate 17 and a base side is made integral to an inner side (central side) of the base plate 17.

In the present aspect, each spring portion 19 is formed integral to the base plate 17 by forming linear notches 19A that extend from an end side to the inner side (central side) of the base plate 17.

As shown in FIG. 5A, the spring portions 19 are formed at a total of eight locations, that is, at four corners 17C of the base plate 17, and four sides 17D between adjacent corners 17C. The spring portions 19 disposed at the corners 17C is positioned so that its extension direction is inclined at substantially 45° with respect to the outer edges (sides 17D) of the base plate 17. The spring portions 19 disposed at the sides 17D are disposed so that the extension directions thereof are orthogonal to the corresponding sides 17D and are disposed at portions corresponding to substantially central portions of opposing sides that oppose each other.

The elastic member 15A is adhered onto the base plate 17 at portions of the base plate 17 at outer sides of portions corresponding to the base sides of the spring portions 19 (outer sides of the alternate long and two short dashes line in FIG. 5A).

At portions of the base plate 17 at central sides of the portions at which the elastic member 15A is adhered, that is, at inner sides of the portions corresponding to the base sides of the spring portions 19 (inner sides of the alternate long and two short dashes line in FIG. 5A), a plurality (nine, in the present aspect) of penetrating holes 21 that penetrate through the base plate 17 are disposed so as to be substantially symmetrical to perpendicular bisectors L1 and L2 of the outer edges (sides 17D) of the base plate 17.

Incidentally, in the present aspect, the hinge mechanism 11 is disposed at the side 17D at the left end side of the paper surface of the base plate 17. Thus, the perpendicular bisector L2 does not bisect the sides 17D at the upper end and lower end sides of the paper surface precisely. However, if the portion (effective portion) of the base plate 17 that actually contributes to the pressing of a document is noted, the perpendicular bisector L2 substantially bisects the sides 17D at the upper end and lower end sides of the surface of the sheet.

First pressing portions 23 that protrude toward the flatbed reading window 7 are disposed at base plate 17 side portions of the document cover 3 that respectively correspond to the spring portions 19 as shown in FIGS. 3 and 4. When the flatbed reading window 7 is covered by the document cover 3, the first pressing portions 23 conveys force due to the weight of the document cover 3 act to press the tip sides of the spring portions 19 toward the flatbed reading window 7.

Second pressing portions 25 that protrude toward the flatbed window 7 are disposed at base plate 17 side portions of the document cover 3 that correspond to the penetrating holes 21. The second pressing portions 25 pass through the penetrating holes 21 and contact the elastic member 15A to convey force due to the weight of the document cover 3 act on the elastic member 15A and thereby press the elastic member 15A toward the flatbed reading window 7.

3. Automatic Document Feeder Device

As shown in FIG. 3, an automatic document feeder (hereinafter referred to as "ADF") is disposed at and near a portion of the document cover 3 that corresponds to the automatic reading window 9. The ADF includes an automatic document conveying mechanism 50 that conveys a document to the automatic reading window 9, etc.

A document tray 51 is a placement portion for placing documents. Documents that have been placed in a layered manner on the document tray 51 are conveyed by the automatic document conveying mechanism 50 to the automatic reading window 9 and thereafter ejected and placed on an ejection tray 53.

3.1. General Arrangement of the ADF Device

The automatic document conveying mechanism 50 includes a separating mechanism 55 and a conveying mechanism 57. The separating mechanism 55 separates the layered documents one at a time. The conveying mechanism 57 conveys a document separated by the separating mechanism 55 to the automatic reading window 9, etc.

The separating mechanism 55 includes separating rollers 55A, 55B and an intake roller 55C. The separating roller 55A applies a conveying force to a document. The separating pad 55B is positioned opposite the separating roller 55A and contacts the separating roller 55A and the document from the opposite side to provide a predetermined conveying resistance to sheets. The intake roller 55C rotates upon contacting a document placed on the document tray 51 to convey the document to the separating roller 55A, etc.

The conveying mechanism 57 includes a conveying roller 57A and a pair of pinching rollers 57B. The conveying roller 57A changes the conveying direction of a document, which has been separated and conveyed by the separating mechanism 55, by substantially 180° to a lower side. The pair of pinching rollers 57B press the document against the conveying roller 57A, etc.

3.2. General Operation of the ADF Device

When the intake roller 55C and the separating roller 55A begin to rotate, the conveying roller 57A begins to rotate in conjunction. A document (this document shall be referred to hereinafter as the "conveyed document"), to which the conveying force is applied by the separating roller 55A, is then conveyed toward the conveying mechanism 57 (conveying roller 57A).

At this point, other documents in contact with the conveyed document tend to move toward the conveying mechanism 57 along with the conveyed document due to a frictional force that arises at surfaces in contact with the conveyed document. However, since these other documents receive the conveying resistance from the separating pad 55B, the conveyed document is separated from the other documents and is conveyed toward the conveying mechanism 57.

4. Characteristics of the Image Reading Apparatus According to the Present Aspect According to the present aspect, the image reading apparatus 1 includes the document presser 15 which is provided on the base plate 17 that is displaceably assembled onto the document cover 3, and the elastic member 15A is adhered onto the document presser 15. Accordingly, distortion of the document cover 3 is absorbed by the displacement of the base plate 17 with respect to the document cover 3, and the comparatively small distortion of the base plate 17 is absorbed by the elastic member 15A.

Further, the pressing force due to the weight of the document cover 3 acts on the base plate 17 via the first pressing portions 23 and the spring portions 19. Accordingly, distortion (warping) of the base plate is corrected by the pressing force. Also, a document is pressed against the flatbed reading window 7 by the force due to the weight of the base plate 17 and the force due to the weight of the document cover 3. Accordingly, the document can be reliably put in close contact with the flatbed reading window 7.

Incidentally, when a central side of the base plate 17 is warped so as to protrude toward the flatbed reading window 7, the outer edges of the base plate 17, that is, the outer edges of the document presser 15 are then put in a state of being raised from the flatbed reading window 7. Thus, the document is raised from the reading window 7 and the quality of the image data read from the document degrades.

In contrast, in the present aspect, the sides at one end of the spring portions 19, that is, the base sides of the spring portions 19 are fixed to the outer edge sides of the base plate 17. Thus, the first pressing portions 23 press the outer edge sides of the base plate 17 toward the flatbed reading window 7. Accordingly, in the present aspect, even when the base plate 17 is warped so as to be protruded toward the flatbed reading window 7, the base plate 17 can be corrected reliably.

Incidentally, when each first pressing portion 23 has a structure that directly presses the base plate 17 instead of via the spring portion 19, the force that presses the base plate will vary due to dimensional variations, etc., of the first pressing portions 23.

In contrast, in the present aspect, the first pressing portions 23 press the base plate 17 via the spring portions 19. Thus, dimensional variations of the first pressing portions 23 can be absorbed by the spring portions 19. Accordingly, since the pressing force can be made to act reliably on the base plate 17, the base plate 17, in other words, the document presser 15 can be pressed toward the flatbed reading window 7 while reliably correcting the base plate 17.

As described above, in the present aspect, a document can be put in close contact with the flatbed reading window 7 reliably. Accordingly, an image recorded on the document can be read reliably.

Incidentally, in the present aspect, the document presser 15 is pressed toward the flatbed reading window 7 while the first pressing portions 23 press the spring portions 19 to correct the base plate 17. Thus, a distance D1 (see FIG. 7), from the tip of each first pressing portion 23 to the flatbed reading window 7 in the state where the flatbed reading window 7 is covered by the document cover 3, is set to be smaller than a thickness dimension of a distance from the sheet 15B to the tip of each spring portion 19 in the state where the flatbed reading window 7 is not covered by the document cover 3, that is, the state where the elastic member 15A is not squashed.

Further, since the spring portions 19 are formed integral to the base plate 17, the number of parts and the man-hours needed for manufacturing the base plate 17 can be reduced, and a document can be put in close contact with the flatbed reading window 7 reliably while suppressing the increase of the manufacturing cost of the image reading apparatus 1.

Further, in the present aspect, the spring portions 19 are disposed so that the tip sides thereof extend toward the outer sides of the base plate 17, and the elastic member 15A is adhered to the base plate 17 at the portions of the base plate 17 at the outer sides of the portions corresponding to the base sides of the spring portions 19. Accordingly, the base sides of the spring portions 19 are positioned at the central side of the base plate 17 and the tip sides of the spring portions 19 are positioned at the outer edge sides of the base plate 17.

Thus, when the spring portions 19 are pressed by the first pressing portions 23, the spring portions 19 make a moment force acting on the base plate 17 in a manner such that the central side of the base plate 17 protrudes toward the document cover 3 and the outer edge sides of the base plate 17 are pressed against the flatbed reading window 7. Accordingly, the outer edge sides of the base plate 17 are pressed so as to be pressed against the flatbed reading window 7.

Meanwhile, the central side of the base plate 17 may be put in a state of being raised from the flatbed reading window 7. However, since the elastic member 15A is adhered to the base plate 17 at the portions of the base plate 17 at the outer sides of the portions corresponding to the base sides of the spring portions 19, the portion of the base plate 17 at the central side of the portions corresponding to the base sides of the spring portions 19 can be displaced comparatively freely with respect to the base plate 17.

Thus, the outer edge sides of the base plate 17 are corrected while being pressed toward the flatbed reading window 7 by the first pressing portions 23 and via the spring portions 19. Further, the portion of the base plate 17 at the central side of the outer edges becomes displaced toward the flatbed reading window 7 and presses a document against the flatbed reading window 7 by its own weight without the elastic member 15A becoming raised. Accordingly, in the present aspect, the document can be pressed against the flatbed reading window 7 across the entire range of the document presser 15, and the document and the flatbed reading window 7 can be put in close contact reliably.

Incidentally, when the base plate 17 is warped so as to protrude toward the document cover 3, the outer edges of the base plate 17, that is, the outer edges of the document presser 15 closely contact the reading window 7 and the central side of the document presser 15 may be put in a state of being raised from the reading window 7. However, since at the portions of the base plate 17 at the central side of the outer edges, the elastic member 15A does not become raised but is displaced toward the flatbed reading window 7 and presses the document against the flatbed reading window 7 by its own weight as described above, the document and the flatbed reading window 7 can be put in close contact reliably.

Further, in the present aspect, the penetrating holes 21 are disposed at portions of the base plate 17 at the inner side of the portions corresponding to the base sides of the spring portions 19 and because the second pressing portions 25 that make the force due to the weight of the document cover 3 act to press the elastic member 15A toward the flatbed reading window 7 are provided. Accordingly, the elastic member 15A can be displaced reliably toward the flatbed reading window 7.

Thus, a document can be pressed against the flatbed reading window 7 across the entire range of the document presser 15, and the document and the flatbed reading window 7 can be put in close contact reliably.

Further, in the present aspect, the central portion of the document presser 15 is pressed toward the flatbed reading window 7 by the elastic member 15A being pressed by the second pressing portions 25. Accordingly, a distance D2 (see FIG. 6), from the tip of each second pressing portion 25 to the flatbed reading window 7, is set to be less than the thickness of the document presser 15, that is, the sum of the thickness of the elastic member 15A and the thickness of the sheet 15B.

Further, in the present aspect, the plurality of the penetrating holes 21 are disposed so as to be substantially symmetrical with respect to the perpendicular bisectors L1 and L2 of the outer edges of the base plate 17. Accordingly, a pressing force can be made to act uniformly on the elastic member 15A, and a document can be pressed against the reading window 7 across the entire range of the document presser 15 more reliably.

Further, in the present aspect, the extension direction of each of the spring portions 19 disposed on the respective corners 17C of the base plate 17 is inclined at substantially 45° with respect to the corresponding outer edges of the base plate 17. Accordingly, the pressing force that acts on each corner 17C of the base plate 17 can be made to act substantially uniformly on the two orthogonal sides 17D that constitute each corner 17C and the base plate 17 can be pressed substantially uniformly.

Thereby, the base plate 17 can be corrected appropriately and the base plate 17 can be pressed and deformed uniformly toward the flatbed reading window 7, a document and the flatbed reading window 7 can be put into close contact reliably.

Further, the extension direction of each of the spring portions 19 disposed between the corners 17C (at the respective sides 17D) is substantially orthogonal to the corresponding outer edge of the base plate 17. Accordingly, the base plate 17 can be pushed towards the flatbed reading window 7 more reliably, and a document and the flatbed reading window 7 can be put into close contact reliably.

Further, the spring portions 19 disposed at the sides 17D are disposed at outer edges of the base plate 17 that correspond to substantially central portions of opposing sides that oppose each other. Accordingly, the base plate 17 can be pushed towards the flatbed reading window 7 more reliably, and a document and the flatbed reading window 7 can be put into close contact reliably.

<Other Aspects>

In the above-described aspects, the spring portions 19 are disposed at the four corners 17C and all corresponding portions of the four sides 17D. However, the present invention is not restricted thereto. The spring portions 19 may instead be disposed at the four corners 17C and the portions corresponding to substantially central portions of just the long sides 17D (the left and right ends in FIG. 5A) among the outer edges of the base plate 17.

Further, in the above-described aspects, the present invention is applied to an image reading apparatus having an automatic conveying and reading function and a flatbed reading function. However, the present invention is not restricted thereto. The present invention may be applied to an image reading apparatus having just a flatbed reading function, an image reading apparatus integrated with an inkjet printer, laser printer, or other image forming apparatus, or a facsimile apparatus, a copier, etc.

Further, in the above-described aspects, the automatic reading window 9 and the flatbed reading window 7 are disposed independent of each other. However, the present invention is not restricted thereto. The present invention may be applied to an image reading apparatus in which the reading windows 7 and 9 are combined.

Also, in the above-described aspects, a CIS is used as the image pickup element 13. However, the present invention is not restricted thereto. For example, a charge-coupled device (CCD) may be used.

The present invention is not restricted to the above-described aspects and other aspects are possible as long as there is agreement with the gist of the invention as described in the claims.

What is claimed is:

1. An image reading apparatus comprising:
   an image pickup element that emits an electrical signal based on received light;
   a document table, on which a document is placed, the document table including a reading window for reading an image of the document;
   a document cover that is assembled onto the document table and is capable of covering the reading window;
   a base plate that has a substantially rectangular shape and includes a flat portion that opposes the reading window, the base plate being displaceable in a direction of separating from the document cover and a direction of approaching the document cover;
   a spring portion that is integrally formed with the base plate; and
   a document presser configured to press the document placed on the document table toward the reading window and includes an elastic member that is elastically deformable and is adhered to a reading window side of the base plate,
   wherein the document cover includes a first pressing portion that conveys force due to a weight of the document cover acting to press the spring portion toward the reading window when the document cover covers the reading window,
   wherein the base plate includes a penetrating hole that penetrates through the base plate, and
   wherein the document cover includes a second pressing portion that passes through the penetrating hole to contact the elastic member and conveys force due to the weight of the document cover acting to press the elastic member toward that reading window when the reading window is covered by the document cover.

2. The image reading apparatus according to claim 1, wherein one end side of the spring portion is integrally formed with an outer edge side of the base plate.

3. The image reading apparatus according to claim 1, wherein the spring portion is provided such that a tip side thereof extends toward an outer side of the base plate, and
   wherein the elastic member is adhered to the base plate at an outer side of the base plate corresponding to a base side of the spring portion.

4. The image reading apparatus according to claim 3, wherein the penetrating hole is disposed at an inner side of the base plate corresponding to the base side of the spring portion.

5. The image reading apparatus according to claim 4, wherein a plurality of penetrating holes are provided in the base plate so as to be substantially symmetrical with respect to a perpendicular bisector of an outer edge of the base plate, and
   wherein the document cover includes a plurality of second pressing portions corresponding to the plurality of penetrating holes.

6. The image reading apparatus according to claim 1, wherein the spring portion includes a plate spring.

7. The image reading apparatus according to claim 1, wherein the document cover includes a plurality of first pressing portions.

8. The image reading apparatus according to claim 1, wherein a plurality of penetrating holes are provided in the base plate, and
   wherein the document cover includes a plurality of second pressing portions corresponding to the plurality of penetrating holes.

9. An image reading apparatus comprising:
   an image pickup element that emits an electrical signal based on received light;
   a document table, on which a document is placed, the document table including a reading window for reading an image of the document;
   a document cover that is assembled onto the document table and is capable of covering the reading window;
   a base plate that has a substantially rectangular shape and includes a flat portion that opposes the reading window, the base plate being displaceable in a direction of separating from the document cover and a direction of approaching the document cover;
   a spring portion that is integrally formed with the base plate; and
   a document presser that presses the document placed on the document table toward the reading window and includes an elastic member that is elastically deformable and is adhered to a reading window side of the base plate,
   wherein the document cover includes a first pressing portion that conveys force due to a weight of the document cover acting to press the spring portion toward the reading window when the document cover covers the reading window,
   wherein the spring portion is provided at a corner of the base plate, and
   wherein an extension direction of the spring portion provided at the corner of the base plate is inclined at substantially 45° with respect to an outer edge side of the base plate.

10. The image reading apparatus according to claim 9, wherein the spring portion is provided between adjacent corners of the base plate, and
    wherein an extension direction of the spring portion provided between adjacent corners of the base plate is substantially orthogonal to an outer edge side of the base plate.

11. The image reading apparatus according to claim 10, wherein the spring portion is provided at a location substantially central between the adjacent corners of the base plate.

12. The image reading apparatus according to claim 10, wherein the base plate has an oblong shape, and
    wherein the spring portion is provided at a location substantially central of a long side of the base plate.

13. The image reading apparatus according to claim 10, wherein the spring portion is provided at the outer edge of the base plate.

* * * * *